United States Patent [19]

Miramonti

[11] Patent Number: 5,614,801
[45] Date of Patent: Mar. 25, 1997

[54] APPARATUS FOR EFFECTIVELY HANDLING A SATURATION CONDITION IN A DIGITAL COMPENSATOR

[75] Inventor: John L. Miramonti, West Lebanon, N.H.

[73] Assignee: Allen-Bradley Company, Inc., Milwaukee, Wis.

[21] Appl. No.: 499,981

[22] Filed: Jul. 10, 1995

[51] Int. Cl.$^6$ .................................................. G05B 11/42
[52] U.S. Cl. ........................... 318/609; 318/610; 364/153; 364/161
[58] Field of Search ..................................... 318/606–610, 318/798, 799; 364/160–163, 153–155

[56] References Cited

U.S. PATENT DOCUMENTS

| | | | |
|---|---|---|---|
| 4,492,907 | 1/1985 | Fabian et al. | 318/586 |
| 4,801,857 | 1/1989 | Bundy | 318/626 |
| 5,384,526 | 1/1995 | Bennett | 318/610 |
| 5,497,063 | 3/1996 | Day et al. | 318/610 |

*Primary Examiner*—Brian Sircus
*Attorney, Agent, or Firm*—James G. Morrow; John M. Miller; John J. Horn

[57] ABSTRACT

An improved method and apparatus for handling saturation conditions in the digital compensator of a control system. A clipping limiter is incorporated in the digital compensator for outputting both a limited signal to be sent to the actuator, and for outputting a clipping signal indicative of a difference between the input and the output of the clipping limiter. The clipping signal is delayed by one sample period, and fed back to the input to the compensator in order to provide a correct amount of compensation when the system is operating at or near saturation.

20 Claims, 3 Drawing Sheets

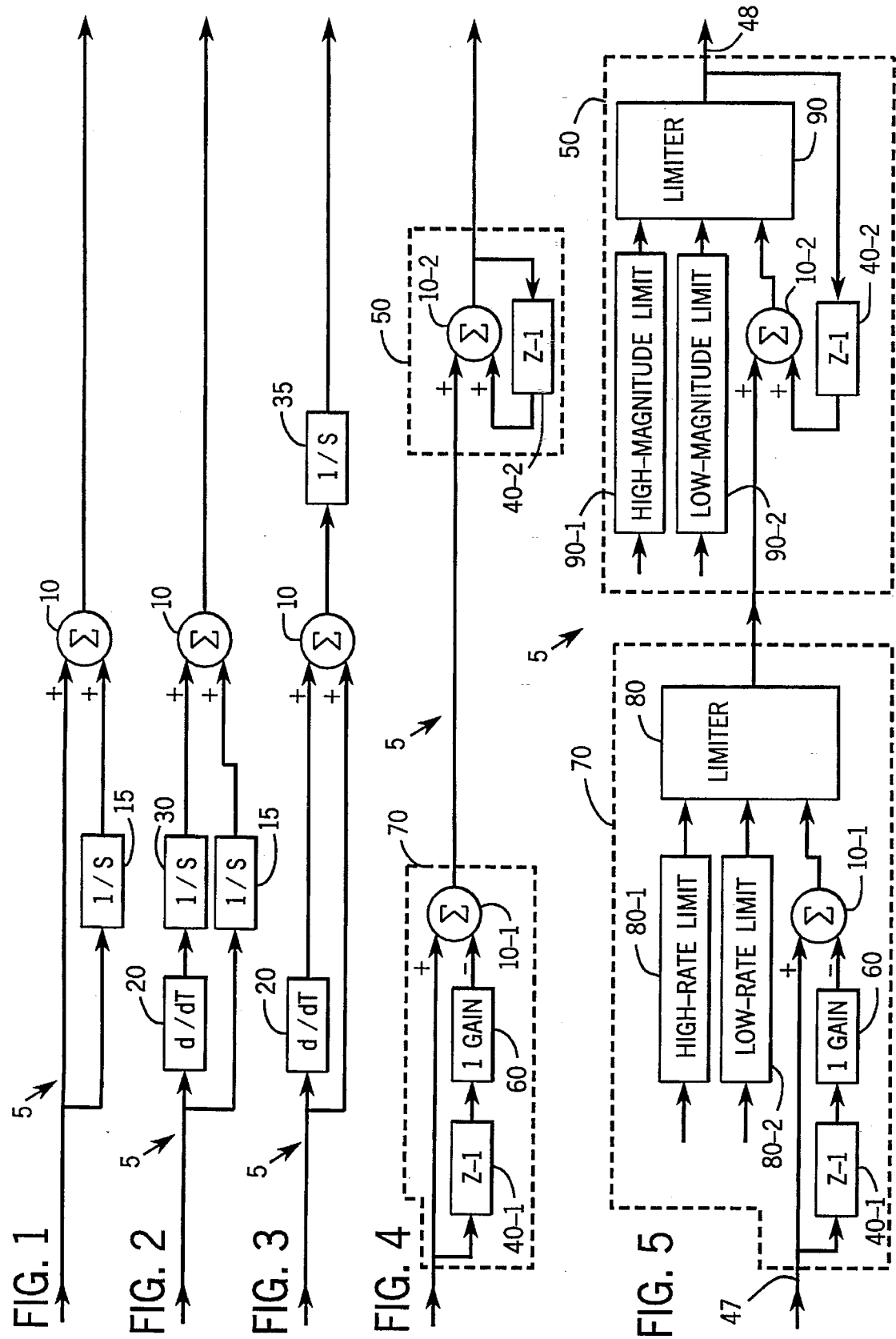

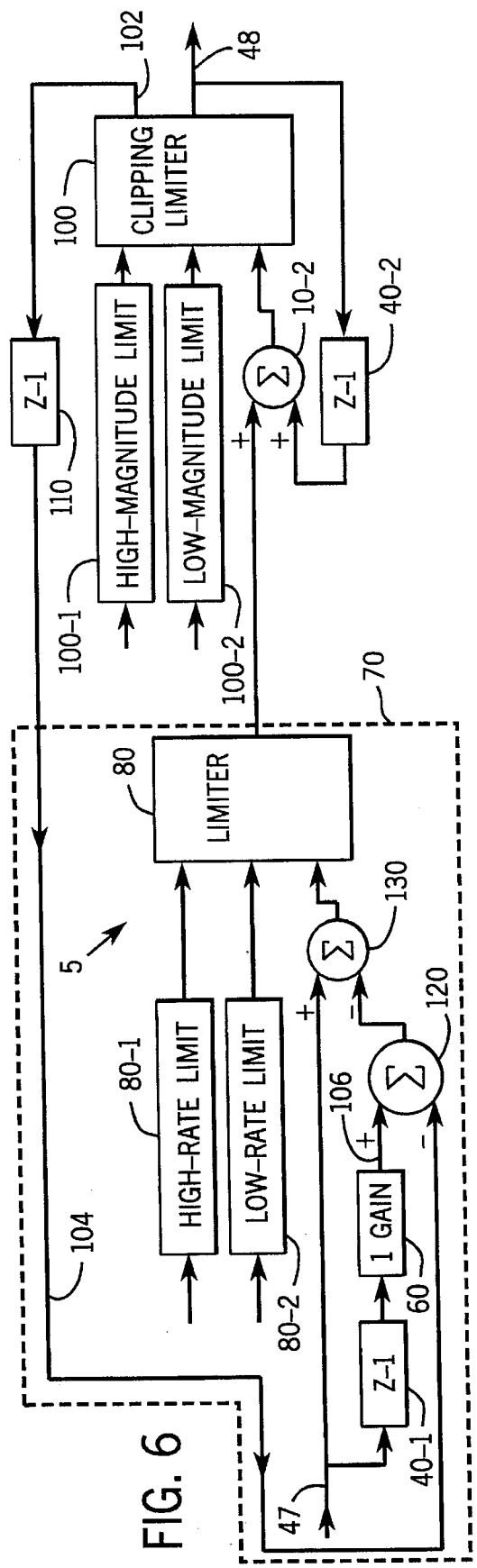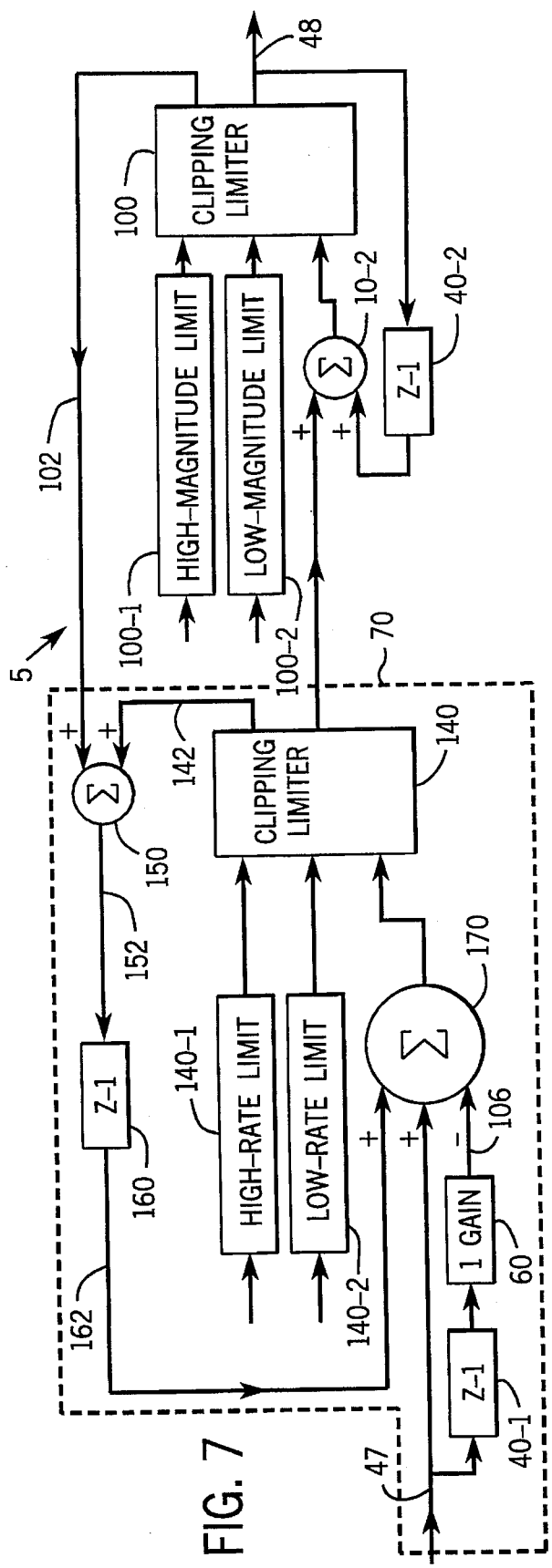

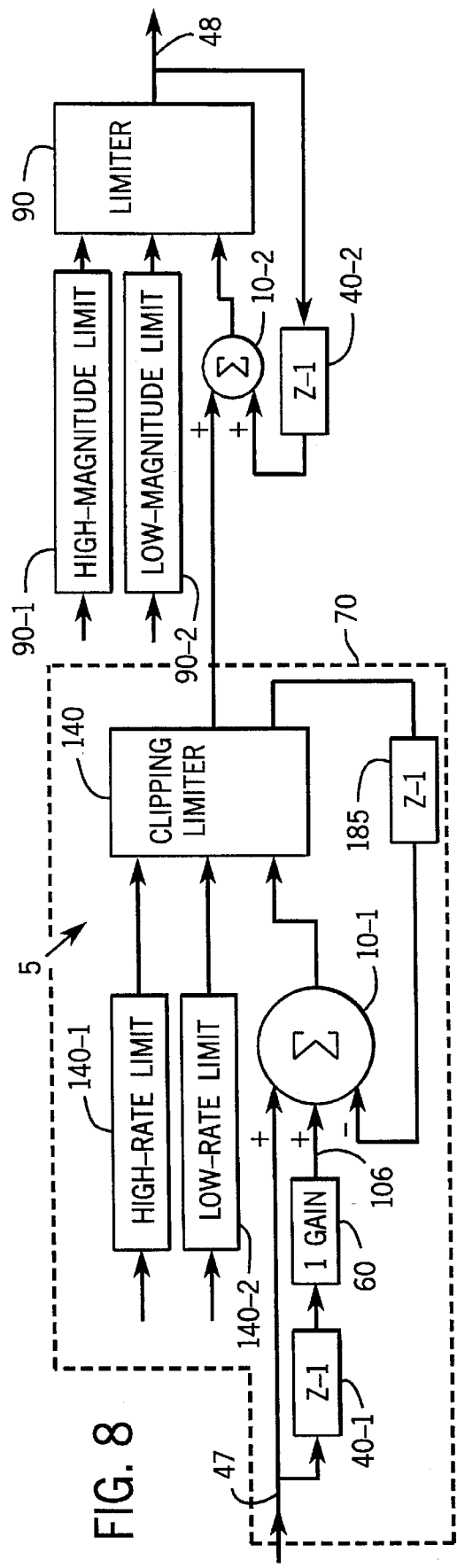
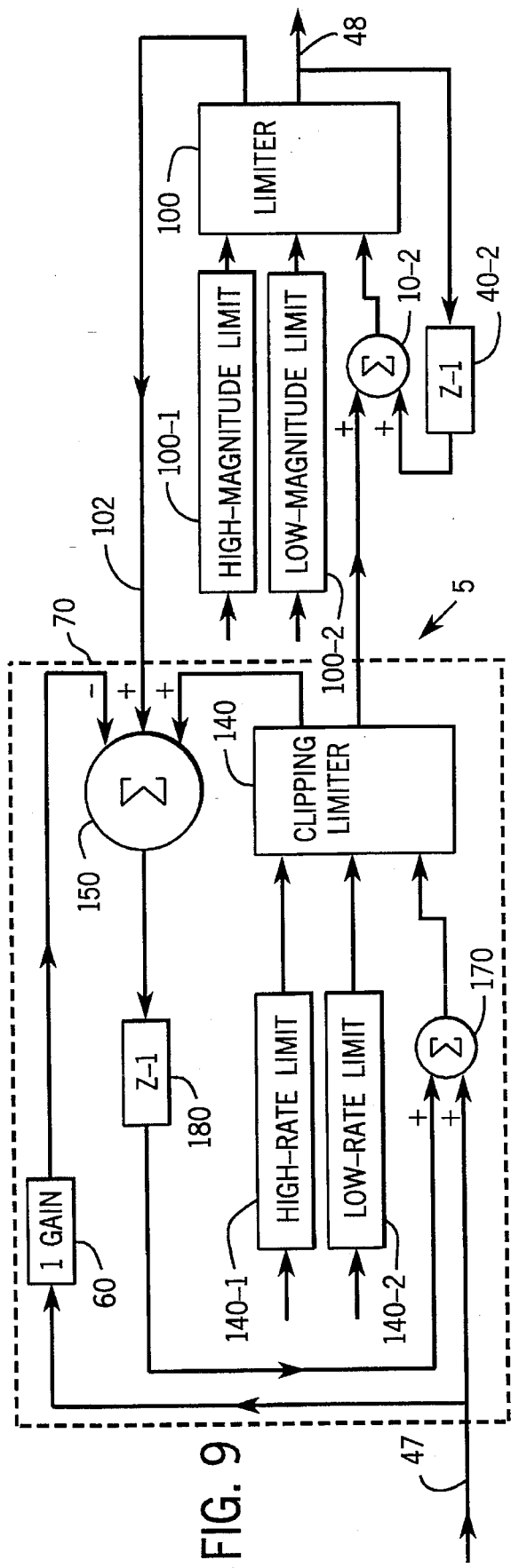
FIG. 8
FIG. 9

APPARATUS FOR EFFECTIVELY HANDLING A SATURATION CONDITION IN A DIGITAL COMPENSATOR

BACKGROUND OF THE INVENTION

The present invention relates to a method and apparatus for controlling a servo actuator such as an electric motor using a proportional-integral compensator. More specifically, the invention relates to a method and apparatus for controlling a servo actuator using a clipping limiter to precisely control the actuator even when the compensator and/or actuator is operating in saturation. The invention is also applicable to process control.

A classic problem encountered in digital servo loop systems involves dealing with saturation effects. Saturation occurs when the output of a compensator or actuator (i.e., the "system") reaches it most extreme value. When this happens, the device normally is no longer operating in a linear condition.

In real implementations, there is a strong economic incentive to use the smallest actuator possible to accomplish a particular task, since the larger the actuator is, the more costly it becomes. There is also a strong economic incentive to perform a task as quickly as possible, and this usually means operating the actuator at or near its physical limits, i.e., in saturation or nearly in saturation.

Classical system theory does not model saturation effects very well, since a saturation condition is a non-linear condition, and classical system theory only works well modeling linear systems. Therefore, classical system theory does not offer much other than the implicit assumption that the system being analyzed must be linear or the predicted performance will not be achieved.

Conventional proportional-integral (PI) compensators are used in forward paths of many feedback control systems. These compensators are driven by an error signal computed from the difference between a reference (setpoint) and a measured value. The output of the compensator drives an actuator, which affects the measured value.

The compensator uses two terms: 1) A "Proportional to Error" term, and 2) an "Integral of Error" term. Both of these terms typically have scaling constants, or gains, associated with them, but these scaling constants will be neglected from further discussion herein, without any loss of generality. The classic PI equation can be expressed as:

$$\text{Output} = \text{Error} + \text{Integral}(\text{Error}) \qquad (1),$$

or, in the frequency domain:

$$Y(s) = X(s) / s = X(s) * (s+1)/s \qquad (2).$$

The above equation (2) yields a pole at the origin and a finite zero (at $s = -1$).

The problem of saturation typically occurs when the "Error" term is large enough to drive an actuator to its physical limit. It is meaningless to drive the output beyond the range which the actuator can manage. When in saturation, the system is non-linear and the feedback loop for controlling the actuator is no longer closed.

Many conventional compensators, however, behave as if the feedback loop was still closed and thus continue to attempt to drive the output to even higher values, since the output is proportional to the error (as seen in the above Equation 1). The linear system theory upon which the compensator design is based no longer applies during the saturation condition, and the behavior of the system begins to deviate from that of the implicit system model the compensator was designed to operate within. This saturation condition persists until the error is reduced sufficiently enough to bring the actuator out of saturation and thereby re-close the feedback loop.

As is known to those of ordinary skill in the art, "Integral Windup" occurs when the output of the actuator is saturated. Integral Windup occurs when the integrator that computes the "Integral of Error" term continues to integrate (i.e., "wind") and attempts to drive the output to even higher values during the period when the actuator is saturated.

When the error term diminishes and the feedback loop re-closes, the Integral of Error term must be "unwound" by having a negative error integrated for an amount of time sufficient to bring the actuator out of saturation. This leads to two undesirable effects: 1) the output "sticks" at the saturated output value for an excessive length of time even though the error has diminished, and 2) the system is forced to deviate from the desired output value until the integrator is "unwound."

In systems with small actuators or high speed response requirements, the performance of the system can become unstable, with the output alternating between saturation at one extreme or the other. Settling time is also greatly extended, thereby leading to a system with poor servo characteristics.

The conventional approach to the saturation problem is to "clamp" the outputs at the saturation limit (or limits) of the actuator. Since the Proportional to Error term of Equation (1) has no history (or memory) associated with it, this method is adequate. The Integral of Error term of Equation (1) which has a history associated with it is then over-ridden, and a value is back-calculated by subtracting the Proportional to Error term from the saturation output level. This appears to prevent "windup" in the integrator, since as the error diminishes to a level sufficient to bring the actuator out of saturation, the output immediately starts dropping.

This conventional approach of "resetting" the integrator has a few problems associated with it, however. First, the integrator is meant to be a long term memory for the compensator. The integrator indicates where the compensator has been, and is intended to cause slow changes on the output of the compensator, to thereby adjust to slowly changing sources of fixed error. By resetting the integrator, "jumps" are caused in the output of the compensator, which is an undesirable condition. Even though these jumps are somewhat masked by the clamps (or limits) on the output of the integrator, they are still noticeable.

Second, when the system operates in the presence of noise just below the saturation limit, or at any time there is noise or a setpoint change sufficient to drive the actuator momentarily into saturation, the integrator is "reset" under the conventional approach, and the output "jumps." This effect leads to noisy, "thrashing" behavior of the servo loop.

Third, calculating the proper value for the integrator to keep the system at the edge of saturation is a non-trivial task. This task becomes substantially more difficult than the ordinary calculation performed when the feedback loop is closed and the system is operating in a linear condition.

Still another problem not addressed by the conventional approach is rate limiting required by the actuator. Most actuators cannot be slewed at an infinite rate, yet this is exactly what is commanded whenever a setpoint change or noise spike enters the system to drive the actuator into saturation.

In view of these problems, it would be desirable to have an integrator that stops integrating and holds its value whenever the actuator is driven into saturation, whether this is for the proportional to error (magnitude of error) term or for the integral of error (rate of error) term. It would also be desirable to set the integrator limits in terms of the known output saturation limits and not have to back-calculate the integral or error term. Still further, it would be desirable to express the rate limits in terms of the output limits of the actuator. Even still further, it would be desirable to have the compensator calculation be identical whether the feedback loop is open or closed. Lastly, it would be desirable to not have any "windup" effects in the feedback loop.

SUMMARY OF THE INVENTION

In view of the problems discussed above, the present invention relates to a system including a proportional-integral compensator in a feedback control system for controlling an actuator. The compensator is configured to receive an error signal and a feedback signal, and to determine an incremental change in the actuator's drive signal. The compensator still further includes a clipping limiter for limiting the incremental change in the error signal to between a predetermined maximum value and a predetermined minimum value as a limited signal, and for determining a clipping amount as the feedback signal. The clipping amount corresponds to a difference between the limited signal and the incremental change in the error signal. The compensator is also configured to digitally integrate the limited signal as a control signal for the actuator.

BRIEF DESCRIPTION OF THE DRAWINGS

The component elements of the invention are illustrated by the following description with reference to the following accompanying drawings:

FIG. 1 shows a block diagram of a conventional compensator that sums a Proportional to Error term to an Integral of Error term;

FIG. 2 shows a block diagram of a conventional compensator similar to FIG. 1, with an integrator and a differentiator canceling themselves out;

FIG. 3 shows a block diagram of a conventional compensator similar to FIG. 2, with the integrator term moved after the summer;

FIG. 4 shows a digital, z-domain diagram of the compensator of FIG. 3;

FIG. 5 shows a compensator utilizing limiters for both rate and magnitude control;

FIG. 6 shows a compensator according to a first embodiment of the invention;

FIG. 7 shows a compensator according to a second embodiment of the invention;

FIG. 8 shows a compensator according to a third embodiment of the invention; and FIG. 9 shows a compensator according to a fourth embodiment of the invention.

DETAILED DESCRIPTION OF THE PREFERRED EMBODIMENTS

The system as described herein properly controls a servo actuator such as an electric motor when the compensator is operating both in a linear region and in a saturated condition. If the Error term of Equation (1) above is not present, the output value will be equal to the Integral of Error, or integrator value. In this case, one can simply clamp the integrator to the known actuator saturation limits. Since a fixed input to the integrator equates to a rate of change in the output value, one can simply clamp the magnitude of the signal driving the integrator to achieve rate limiting.

The classical PI equation given in Equation (1) is known as the "position form", since this equation computes the position of the output each time it is executed. An alternate form of this equation, known as the "velocity form", calculates the change in position each time it is executed. The velocity form is simply the derivative of the position form. If the velocity form is followed by an integrator, then one would have an output equivalent to the position form. Also, if the integrator has rate limiters preceding it and magnitude clamps incorporated into it, one would obtain a compensator that achieves the desired behavior both in nonsaturated and in saturated conditions.

FIGS. 1, 2 and 3 illustrate in block diagram form a derivation of a "velocity" form compensator circuit 5. Note that the gain terms for the Proportional to Error (P) term and the Integral of Error (I) term are not shown in order to simplify the explanation.

FIG. 1 is a block diagram implementation of a unity gain "P term" and a unity gain "I term" summed at a summing circuit 10 in order to generate an output signal. The I term is obtained at the output of the integrator (1/S) circuit 15. FIG. 2 replaces the unity gain "P term" with a derivative circuit 20 and an integrator (1/S) circuit 30. FIG. 3 has an integrator (1/S) circuit 35 in a position after the summing circuit 10, due to the superposition property, and operates in a manner similar to the compensator 5 of FIG. 2. The signal produced by summing circuit 10 and applied to integrator (1/S) circuit 35 in FIG. 3 corresponds to the rate of change of the output of the compensator 5.

FIG. 4 shows the transformation of the block diagram of FIG. 3 from the frequency domain to the z-domain, or digital domain. In FIG. 4, the z-1 circuits 40-1, 40-2 are unit delays, which delay their respective inputs by one sample period. The combination of the summing circuit 10-2 and the z-1 circuit 40-2 form a digital integrator circuit 50.

The operation of the digital integrator circuit 50 will be described below in detail. For example, assume that the input to the non-feedback input of the summing circuit 10-2 is zero. As long as the input to the summing circuit 10-2 is zero, (and assuming the initial output was zero) the output of the summing circuit 10-2 remains at zero. If the non-feedback input of summing circuit 10-2 is set to a one unit level (unit scaling is arbitrary) the output of summing circuit 10-2 increases by one unit for each sample period, due to the feeding back of the output of summing circuit 10-2 to the feedback input of summing circuit 10-2. If the output of summing circuit 10-2 is reset to zero, the output of summing circuit 10-2 remains at the level last achieved. Thus, the combination of summing circuit 10-2 and the z-1 circuit 40-2 provides a digital integrator circuit 50.

Ignoring for the moment the "I-gain" block 60 in FIG. 4 (i.e., assume a gain of unity) the combination of summing circuit 10-1 and z-1 circuit 40-1 form a digital differentiator circuit 70. The output value produced by summing circuit 10-1 corresponds to the difference between successive input samples, or the rate of change per sample period. Integration of this difference by the digital integrator circuit 50 forms the Integral of Error (I) term of Equation (1).

FIG. 5 shows the addition of two limiter circuits 80, 90 to compensator circuit 5. The circuits 80 and 90 keep values between two predetermined limits, that is, between minimum predetermined limits stored in memories 80-1, 90-1 and maximum predetermined limits stored in memories 80-2, 90-2.

Limiter circuit 80 is shown in FIG. 5 as part of the digital differentiator circuit 70 and before the digital integrator circuit 50. Limiter circuit 80 is used to limit the rate of change of the output of circuit 70, and can thus be referred to as a "rate" limiter. Limiter circuit 90 is shown in FIG. 5 as part of the digital integrator circuit 50. Limiter circuit 90 is used to clamp the output magnitude of circuit 50, and can thus be referred to as a "magnitude" limiter.

Compensator circuit 5 as shown in FIG. 5 has a problem associated with it. More specifically, assume that the Integral of Error term is disabled (i.e., I Gain block 60 =1), and that the input to compensator circuit 5 has been steady at some fixed value. If a step change is made in the input 47 to compensator circuit 5, the difference between the previous value and the new value is calculated and supplied to the digital integrator circuit 50. The output 48 of compensator circuit 5 then steps up to the new output value. Now assume that the input 47 to compensator circuit 5 returns to its original, fixed value. The difference is again calculated and is exactly the value needed (i.e., the negative of the first step change) to return the output 48 of compensator circuit 5 back to its original value.

This technique works well as long as limiter circuit 90 does not clamp the output 48. If the step change in the input 47 to compensator circuit 5 is sufficient to drive the actuator into a saturation condition, this will cause limiter circuit 90 to clamp its output 48. Due to this clamping by limiter circuit 90, the output value of limiter circuit 90 does not change by as large a step as the input value to compensator circuit 5.

If the input value 47 to compensator circuit 5 returns back to its original value, the magnitude of the difference calculated is the value needed to return the output 48 of compensator circuit 5 back to its original value if the output of limiter circuit 90 had not been clamped. However, this value is too large to return the clamped output of limiter circuit 90 back to its original value.

The difference between where the output 48 of compensator circuit 5 returns to and the original value it should have returned to is equal to the magnitude that the output of compensator circuit 5 was reduced by the magnitude limiter circuit 90. If the value that magnitude limiter circuit 90 reduces the output by is stored (i.e. "remembered") and used to reduce the size of the input to integrator circuit 50, the output 48 of compensator circuit 5 will return back to its original value.

FIG. 6 shows a version of a first embodiment of the system that accomplishes this feature. In FIG. 6, a clipping limiter circuit 100 is used at the output of compensator circuit 5. Clipping limiter circuit 100 has an additional output 102 as compared to conventional limiters circuits 80, 90 of FIG. 5. This second output 102 of the clipping limiter circuit 100 presents the value that the output of limiter circuit 100 was reduced by, i.e., the clipped-off portion of the input. This clipped-off portion is delayed by one sample period, by utilizing the z-1 delay circuit 110, and the delayed clipped-off portion is fed back to the input of compensator circuit 5 as signal 104 in order to reduce the magnitude of the delayed (saved) input value. Signal 104 offsets the magnitude of the input 47 when the system is in saturation. More specifically, limiter circuit 100 clips the magnitude portion of the error signal (i.e., magnitude limiter). A summing circuit 120 subtracts the feedback clipped signal 104 from the delayed error signal 106, and a summing circuit 130 subtracts the output of summing circuit 120 from the error signal 47 associated with the feedback device (i.e. position or velocity feedback) associated with the actuator (not shown).

FIG. 7 shows a second embodiment of the system in which a second clipping limiter circuit 140 is used. Limiter circuit 140 clips the rate portion of the error signal (i.e., rate limiter). In FIG. 7, the clipped-off output 142 of the clipping limiter 140 is fed back to a summing circuit 150, which also receives the clipped-off output 102 of the first clipping limiter 100. The output 152 of the summing circuit 150 is delayed by one sample period by a delay circuit 160, and that delayed output 162 is fed to a summing circuit 170. Summing circuit 170 also receives the error signal 47 feedback associated with a device (not shown) and the delayed error signal 106 that has passed through the delay circuit 40-1 and the 1 gain circuit 60.

FIG. 8 shows a third embodiment of the invention, in which limiter circuit 140 is used as a rate limiter, and a standard limiter 90 is used as the magnitude limiter.

FIG. 9 shows a fourth embodiment of the system. In FIG. 7, there are two z-1 delay circuits 160, 40-1 feeding a summing circuit 170 in the digital differentiator circuit 70. These outputs can be summed together and delayed by a single delay element, instead of being individually delayed, thereby eliminating one z-1 circuit. This single delay circuit is shown as z-1 circuit 180 in FIG. 9.

In the embodiment of FIG. 9, digital differentiator circuit 70 determines the difference between the new input and an "adjusted" delayed input. The adjustment is made to compensate for the non-linearity introduced by the rate and magnitude clamping processes. By way of modification, the "adjusted" delayed input can also be adjusted by other terms. For example, the adjusted delayed input can also be adjusted to implement friction compensation, "droop" functionality, and other linear and non-linear compensation schemes. In these cases, all changes to the output 48 of compensator circuit 5 are still both rate and magnitude limited.

The invention as described herein can be implemented for other desired features. For example, presetting of the integrator circuit 50, which usually means presetting of the output value 48 of compensator circuit 5, is both direct and straightforward. In this case, the integrator circuit 50 is simply set to the desired output value, such as is known as an "integral preset" in a PI system or "bias" or "output offset" in a P-only system.

Feedback (servo) control systems are typically operated in one of three modes: disabled, enabled (automatic) and, in process control systems, enabled (manual). "Manual" means that the output is active and set manually by the user, not automatically by feedback through the compensator. All of these modes can be easily controlled by simply managing parameter (gain) settings. If the rate limiter's parameters are set to zero, there will be no change in the output, thereby yielding an enabled (manual) operation. If the integrator is then preset to zero, the disabled operation is achieved, which is simply a special case of the enabled (manual) operation.

All of these implementations (P-only, I-only, PI, PI with Negative Feed Forward (NFF), Droop, Integrator Preset, Output Offset, Manual/Automatic/Disabled) and "Bumpless Transfer" can be achieved simply through parameter settings without resorting to very much conditional logic. This allows for fast, simple calculations, that can be easily debugged and are well suited to implementation on anything from an application specific integrated circuit (ASIC) to a digital signal processor (DSP).

While preferred embodiments have been described herein, other modifications to the invention may become apparent to one of ordinary skill in the art without departing from the scope of the invention as described herein. For example, the circuits of the control system can be implemented in appropriately programmed discrete or integrated digital control circuits, such as discrete logic circuits, microprocessors, or digital signal processors. Additionally, the system described herein may be used to control actuators based upon errors in desired parameters such as velocity and position.

While each of the elements of the compensator circuit are described above as "circuits" it will be known to those of ordinary skill in the art that these elements, such as the "z-1" element 40-1 in FIG. 4, may also be implemented in software.

What is claimed is:

1. A compensator in a control system for controlling an actuator based upon an error signal applied from an error signal output and a feedback signal, comprising:

an error signal processing circuit coupled to said error signal output to determine an incremental change in said error signal based on samples of said error signal and said feedback signal;

a clipping circuit coupled to said error signal processing circuit to limit said incremental change in said error signal to between a predetermined maximum value and a predetermined minimum value as a limited signal, and to determine a clipping difference when said incremental change in said error signal is greater than said predetermined maximum value or less than said predetermined minimum value, said clipping difference corresponding to said feedback signal; and an integrating circuit coupled to said clipping circuit to digitally integrate said limited signal to produce a control signal for said actuator.

2. A compensator in a control system for controlling an actuator based upon an error signal applied from an error signal output and a feedback signal according to claim 1, wherein said error signal processing circuit determines an incremental change in said error signal based upon a difference between two most recent consecutive samples of said error signal added to said feedback signal.

3. A compensator in a control system for controlling an actuator based upon an error signal applied from an error signal output and a feedback signal according to claim 1, wherein said clipping difference is delayed by a predetermined amount of time and fed back to said error signal processing circuit as said feedback signal.

4. A compensator in a control system for controlling an actuator based upon an error signal applied from an error signal output and a feedback signal according to claim 1, wherein said error signal processing circuit comprises:

a delay circuit configured to delay said error signal by a predetermined amount of time and to output a delayed error signal as a result thereof;

an amplifier configured to provide a predetermined gain value to said delayed error signal and to output a delayed amplified error signal as a result thereof; and an arithmetic unit configured to subtract said feedback signal from said delayed amplified error signal and to add said error signal thereto, said arithmetic unit configured to output a first arithmetic signal as a result thereof, wherein said first arithmetic signal corresponds to said incremental change in said error signal.

5. A compensator in a control system for controlling an actuator based upon an error signal applied from an error signal output and a feedback signal according to claim 4, wherein said integrating circuit comprises:

a second arithmetic unit having a first input coupled to receive said limited signal from said clipping circuit and having a second input coupled to receive a delayed limited signal, said second arithmetic unit configured to output a second arithmetic signal as a result of adding said delayed limited signal to said limited signal;

a limiter coupled to said second arithmetic unit and configured to limit said second arithmetic signal to between a first maximum rate value and a first minimum rate value as said control signal; and a second delay circuit coupled to receive said control signal from said limiter, said second delay circuit configured to delay said control signal by a second predetermined amount of time and to output said delayed limited signal as a result thereof.

6. A compensator in a control system for controlling an actuator based upon an error signal applied from an error signal output and a feedback signal, comprising:

an error signal processing circuit coupled to said error signal output to determine an incremental change in said error signal based on samples of said error signal and said feedback signal;

a limiter coupled to said error signal processing circuit to limit said incremental change in said error signal to between a predetermined maximum value and predetermined minimum value as a first limited signal;

an integrating circuit coupled to said limiter to digitally integrate said first limited signal and a control signal to produce an integrated signal; and a clipping circuit coupled to said integrating circuit to limit said integrated signal to between a predetermined maximum value and a predetermined minimum value as a second limited signal, and to determine a clipping difference when said integrated signal is different from said second limited signal, said clipping difference corresponding to said feedback signal and said second limited signal corresponding to said control signal for said actuator.

7. A proportional-integral compensator in a feedback control system for controlling an actuator, comprising:

means for receiving a sampled error signal from said actuator and a feedback signal;

means for determining an incremental change in said error signal based on said error signal and said feedback signal;

means for limiting said incremental change in said error signal to between a predetermined maximum value and predetermined minimum value as a limited signal, and for determining a clipping difference when said incremental change in said error signal is greater than said predetermined maximum value or less than said predetermined minimum value, said clipping difference corresponding to said feedback signal; and means for digitally integrating said limited signal as a control signal to said actuator.

8. A proportional-integral compensator in a feedback control system for controlling an actuator according to claim 7, wherein said means for determining an incremental change in said error signal corresponds to a difference between said two most recent consecutive samples of said error signal added to said feedback signal.

9. A proportional-integral compensator in a feedback control system for controlling an actuator according to claim 7, wherein said clipping difference corresponds to a difference between said limited signal and said incremental change in said error signal.

10. A proportional-integral compensator in a feedback control system for controlling an actuator according to claim 7, wherein said clipping difference is delayed by a predetermined amount of time and fed back to said receiving means as said feedback signal.

11. A proportional-integral compensator in a feedback control system for controlling an actuator according to claim 7, wherein said means for determining an incremental change in said error signal comprises:

a delay circuit configured to delay said error signal by a predetermined amount of time as a delayed error signal;

an amplifier coupled to said delay circuit and configured to provide a predetermined gain value to said delayed error signal as a delayed amplified error signal; and an arithmetic unit configured to add said delayed amplified error signal to said error signal and to output said incremental change in said error signal as a result thereof.

12. A proportional-integral compensator in a feedback control system for controlling an actuator according to claim 11, wherein said means for digitally integrating said limited signal as said feedback signal comprises:

a second delay circuit configured to delay said feedback signal by said predetermined amount of time as a delayed feedback signal; and a second arithmetic unit configured to add said incremental change in said error signal to said delayed feedback signal and to output said feedback signal as a result thereof.

13. A method for controlling an actuator using a compensator in a control system based upon an error signal applied from an error signal output and a feedback signal, comprising the steps of:

a) determining an incremental change in said error signal based on samples of said error signal and said feedback signal;

b) limiting said incremental change in said error signal to between a predetermined maximum value and a predetermined minimum value as a limited signal;

c) determining a clipping difference between said incremental change in said error signal and said limited signal; and d) integrating said limited signal to produce a control signal for said actuator.

14. A method for controlling an actuator using a compensator in a control system based upon an error signal applied from an error signal output and a feedback signal according to claim 13, wherein the step a) determines said incremental change in said error signal based upon two most recent consecutive samples of said error signal added to said feedback signal.

15. A method for controlling an actuator using a compensator in a control system based upon an error signal applied from an error signal output and a feedback signal according to claim 13, wherein said clipping difference determined in the step c) is delayed by one sample period and fed back as said feedback signal.

16. A proportional-integral compensator in a feedback control system for controlling an actuator, comprising:

means for receiving an error signal from said actuator;

a first delay circuit configured to delay said error signal for a first predetermined amount of time and to output a delayed error signal as a result thereof;

an amplifier configured to provide a predetermined gain value to said delayed error signal and to output a delayed amplified error signal as a result thereof;

a first arithmetic unit configured to subtract a first feedback error signal from said delayed amplified error signal and to output a first arithmetic signal as a result thereof;

a second arithmetic unit configured to subtract said first arithmetic signal from said error signal and to output a second arithmetic signal as a result thereof;

a limiter coupled to said second arithmetic unit and having a first maximum rate value and a first minimum rate value, wherein when said second arithmetic signal is less than said first minimum rate value, said limiter outputs said first minimum rate value on an output port, and when said second arithmetic signal is greater than said first maximum rate value, said limiter outputs said first maximum rate value on said output port, and when said second arithmetic signal is between said first minimum rate value and said first maximum rate value, said limiter outputs said second arithmetic signal on said output port;

a third arithmetic unit having a first input coupled to said output of said limiter and having a second input coupled to receive a second feedback error signal, said third arithmetic unit configured to output a third arithmetic signal as a result of adding said output of said limiter to said second feedback error signal;

a clipping limiter coupled to said output of said third arithmetic unit and having a second minimum rate value and a second maximum rate value, wherein when said third arithmetic signal is less than said second minimum rate value, said clipping limiter outputs said second minimum rate value on a first output port and a value equal to a difference between second minimum rate value and said third arithmetic signal on a second output port, and when said third arithmetic signal is greater than said second maximum rate value, said clipping limiter outputs said second maximum rate value on said second output port and a value equal to a difference between said second maximum rate value and said third arithmetic signal on said second output port, and when said third arithmetic signal is between said second minimum rate value and said second maximum rate value, said clipping limiter outputs said third arithmetic signal on said first output port and a zero value on said second output port;

a second delay circuit coupled to said second output port of said clipping limiter, said second delay circuit configured to delay a value received from said second output port of said clipping limiter by a second predetermined amount of time and to output said second feedback signal as a result thereof; and a third delay circuit coupled to said first output port of said clipping limiter, said third delay circuit configured to delay a value received from said first output port of said clipping limiter by a third predetermined amount of time and to output said first feedback error signal as a result thereof.

17. A proportional-integral compensator in a feedback control system for controlling an actuator according to claim 16, wherein said first predetermined amount of time, said second predetermined amount of time, and said third predetermined amount of time are equivalent.

18. A proportional-integral compensator in a feedback control system for controlling an actuator according to claim 16, wherein said first maximum rate value is greater than or equal to said first minimum rate value.

19. A proportional-integral compensator in a feedback control system for controlling an actuator according to claim 16, wherein said second maximum rate value is greater than or equal to said second minimum rate value.

20. A proportional-integral compensator in a feedback control system for controlling an actuator according to claim 16, wherein said predetermined gain value is within a range of zero and one, and wherein said predetermined gain value determines an amount of said delayed error signal that is output from said first arithmetic unit as said first arithmetic signal.

* * * * *